April 10, 1928.

L. E. SCAGGS 1,665,984

TRANSMISSION

Filed Oct. 23, 1925

L. E. Scaggs,
INVENTOR

BY Victor J. Evans
ATTORNEY

WITNESS:

April 10, 1928.

L. E. SCAGGS 1,665,984

TRANSMISSION

Filed Oct. 23, 1925

L. E. Scaggs,
INVENTOR

BY Victor J. Evans
ATTORNEY

WITNESS:

Patented Apr. 10, 1928.

1,665,984

UNITED STATES PATENT OFFICE.

LUTHER E. SCAGGS, OF CORSICANA, TEXAS.

TRANSMISSION.

Application filed October 23, 1925. Serial No. 64,405.

This invention relates to transmission means for engines, the general object of the invention being to so arrange the transmission means with respect to the engine that the pull or strain is on a straight line, which eliminates the side strain present where the transmission is arranged at the side of the engine. This will prevent the foundations of the engine and transmission from becoming loose and will remove strain from the bearings and thus prevent breaking of the engine crank shaft, clutch parts and other parts of the transmission and engine. It will also permit a smaller engine house to be used and will simplify the installation and the operation of the power unit.

Another object of the invention is to connect one end of the crank shaft of the engine directly with the pulley shaft and to connect the other end of the crank shaft with a reversing shaft which is geared to the pulley shaft, with clutch means for permitting the pulley shaft to be driven from either connection.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which:—

Figure 2 is an end view.

Figure 1:
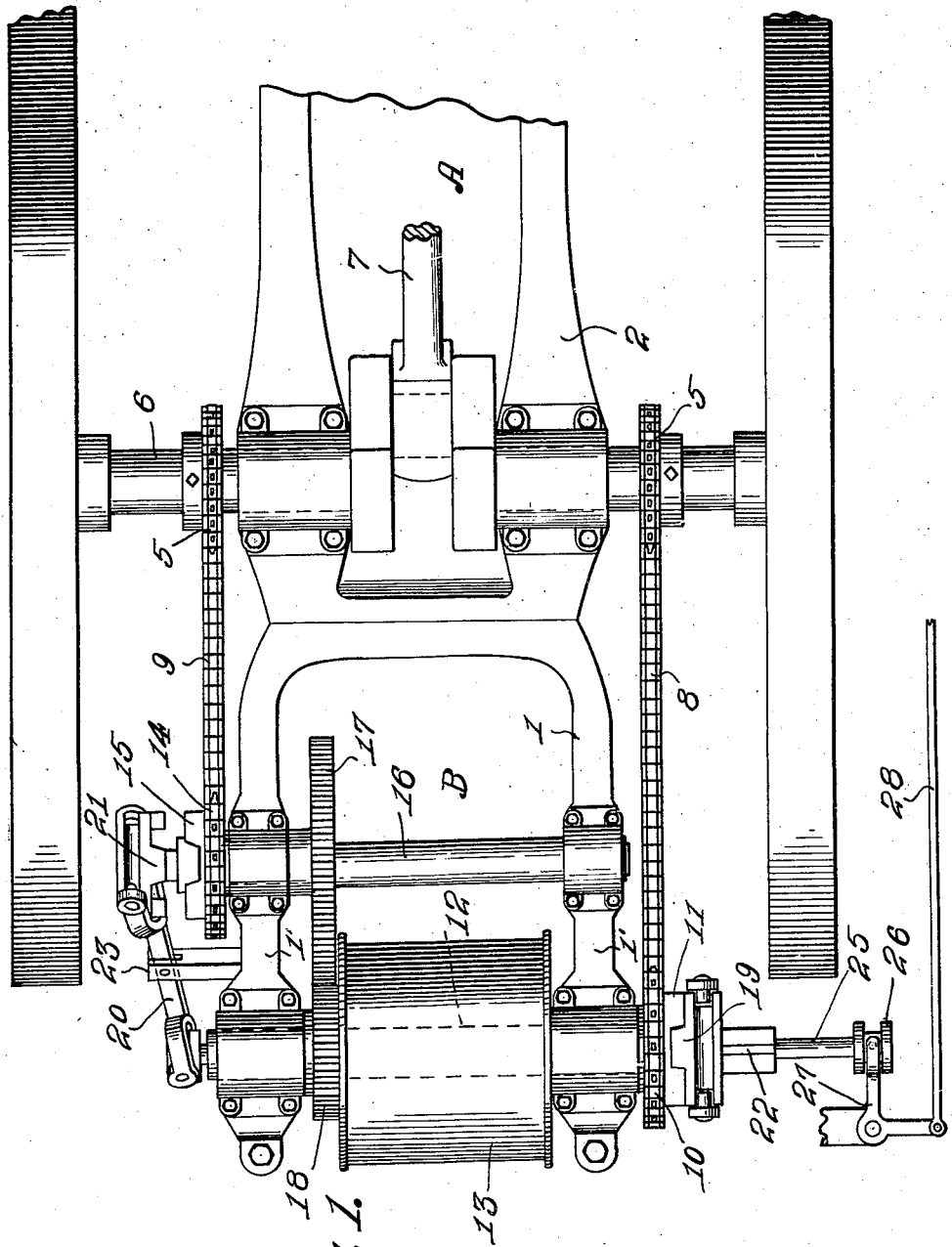
Figure 1 is a plan view of the invention.
Figure 3:
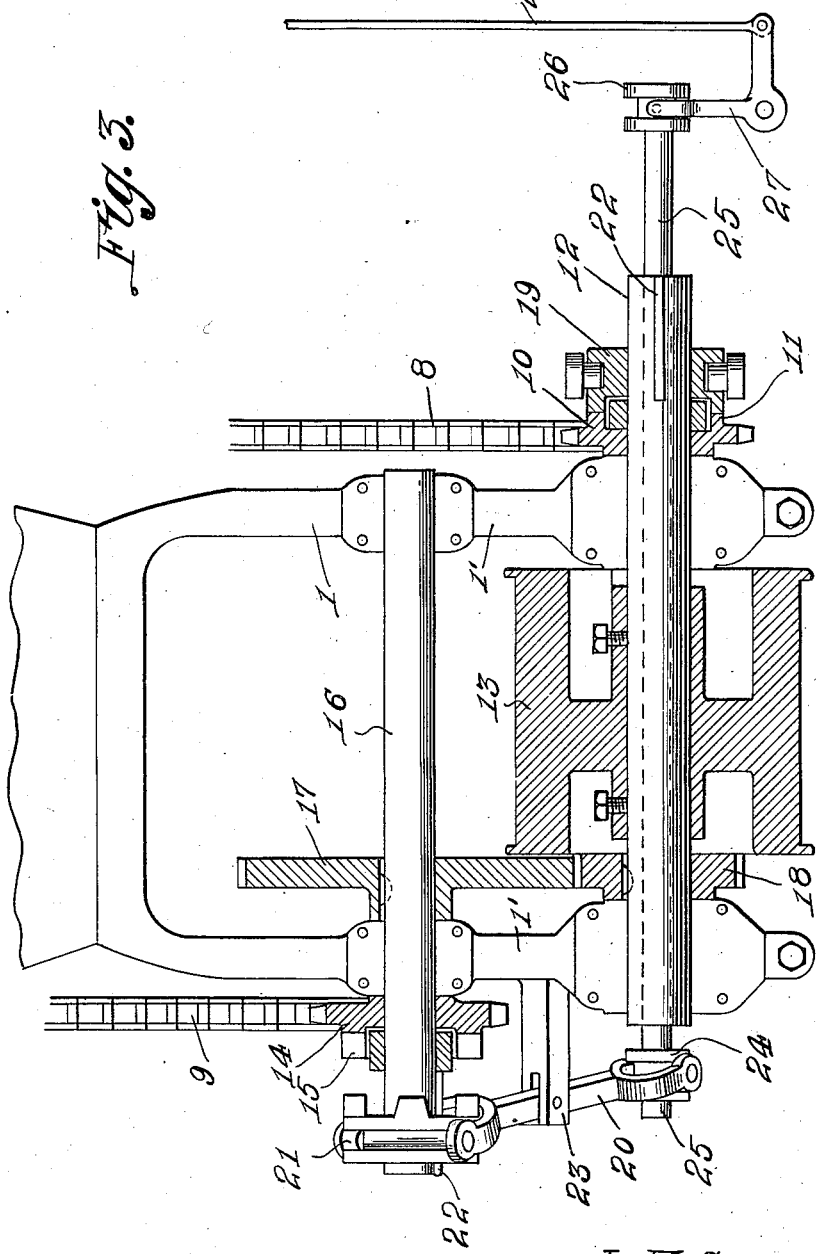
Figure 3 is a horizontal sectional view through the transmission means.

As shown in these views, the transmission means are arranged in front of the engine, instead of at the side thereof, as is usual, so that the strain is a direct one and not a side strain as is the case where the transmission is connected with one end of the crank shaft. By "front end", I mean the crank shaft end of the bed plate.

In carrying out my invention, I connect the frame 1 of the transmission B to the end of the frame 2 of the engine A. It will, of course, be understood that the frames may be formed integral or connected together in any desired manner and may be supported by any suitable kind of a base. A sprocket 5 is connected to each end of the crank shaft 6 of the engine, the connecting rod 7 of the piston of the engine being connected with the center of the crank shaft, as shown. Sprocket chains 8 and 9 pass over the sprockets 5 and the chain 8 passes over a sprocket 10 which is formed with a clutch part 11 and is loosely mounted on a shaft 12 which is rotatably mounted in the frame 1 and to which the pulley 13 of the transmission means is secured. The chain 9 passes over a sprocket 14 which has a clutch part 15 and which is loosely mounted on a shaft 16 journaled in the frame 1 and to which is keyed a gear 17 which meshes with a gear 18 keyed to the shaft 12. A clutch part 19 engages the part 11 and is keyed to shaft 12, so that it can slide thereon, and a clutch part 21 engages the part 15 and is slidably mounted on the shaft 16 but is caused to rotate with said shaft by means of a key. The keys are shown at 22.

A clutch lever 20 is pivoted to an extension 23 on each post 1' of the frame 1. Each lever has its forked upper end engaging a groove in each movable or male part of each clutch assembly and the lower ends of the levers engage grooved collars 24 which are carried by a rod 25 slidably mounted in the post 1'. A collar 26 is connected with one end of said rod 25, and the forked end of the bell crank 27 engages said collar 26. A link 28 connects the bell crank with a hand lever or other manually operated part, so that the clutches must be shifted through means of the levers 20, rod 25, bell crank 27 and the manually operated means by an operator stationed at any suitable point.

From the foregoing, it will be seen that the transmission means are located directly in front of the crank shaft of the engine and are connected therewith by the chains 8 and 9. It will also be seen that when the hand lever or other part to which the link 28 is attached is shifted in one direction, the clutch part 19 will engage the part 11 through the shifting of the rod 20, while the part 21 is moved out of engagement with the part 15. This will cause the shaft 12 and pulley 13 to be rotated directly from the crank shaft through means of the chain 8 and the sprockets 5 and 10. When the hand lever is shifted in an opposite direction, the part 19 will leave the part 11 and the part 21 will engage the part 15, so that the drive will be from the crank shaft, sprocket 5, chain 9, sprocket 14 to shaft 16 and through the gears 17 and 18 to the shaft 12, so that the pulley 13 will be driven in a reverse direction. When the lever is in a neutral position, both male parts of the clutch will be out of engagement with the female part.

The main purpose of this invention is to place the transmission in front of the engine to secure a straight line pull instead of an angular one. The invention is mainly intended for use on horizontal engines used in the oil fields though it will, of course, be understood that it is applicable to other engines and for different purposes.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with an engine, its crank shaft and a base upon which the crank shaft is journaled, a second base connected with the front end of the first base, a pair of shafts journaled in the second base, gears connecting the two shafts together, sprocket means connecting each shaft with the crank shaft, a pulley on one shaft, clutch means for connecting each sprocket means with each shaft, a rod slidably mounted at the front of the second base, means for sliding the rod, a pair of grooved collars on the rod, a lever for shifting each clutch means, one end of each lever engaging one of the collars.

In testimony whereof I affix my signature.

LUTHER E. SCAGGS.